J. SMITH.
Nut-Lock.
No. 215,686.  Patented May 20, 1879.
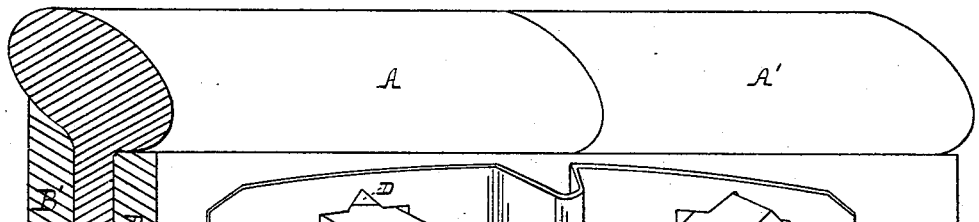

UNITED STATES PATENT OFFICE.

JOHN SMITH, OF VERONA, PENNSYLVANIA.

IMPROVEMENT IN NUT-LOCKS.

Specification forming part of Letters Patent No. 215,686, dated May 20, 1879; application filed August 13, 1878.

*To all whom it may concern:*

Be it known that I, JOHN SMITH, of Verona borough, in the county of Allegheny and State of Pennsylvania, have invented a new and useful Improvement in Nut-Locks; and I do hereby declare the following to be a full, clear, and exact description thereof, reference being had to the accompanying drawings, forming a part of this specification, in which—

Figure 1 is a perspective view, illustrating my improvement as applied to rail-joints. Fig. 2 is a horizontal section of the same, and Fig. 3 is a view of my improved spring-locking plate.

Like letters of reference indicate like parts in each.

My invention relates to devices commonly called "lock-nuts," for securely fastening nuts used on railway-rails, cars, and similar places where the nuts are subjected to severe jars, to prevent them from unscrewing, and thus permitting the loosening and separation of the parts so joined together.

My invention consists in a spring-plate provided with a bend or rib to allow of the expansion or contraction of the rail, and having two wing-washers stamped out of it, which washers are connected with the plate by means of straps, so that when the bolts are passed through the washers and the nuts screwed tight against them the plate will spring up around the nuts and prevent them from turning.

It also consists in certain details of construction, hereinafter more specifically set forth.

To enable others skilled in the art to make and use my invention, I will describe its construction and operation.

In the drawings referred to, my invention is illustrated as applied to a rail-joint, in which A A' represent the rails, and B B' the fish-bars used to connect the rails together. These are of the usual construction, one fish-bar, B', having the oblong slot, or any other suitable device to prevent the bolt from turning. The spring-plate C is made of sheet-iron, steel, or other suitable material. It is wider than the greatest width of the nuts, and is adapted to fit over two bolts. From the body of the plate C are stamped or cut the wing-washers D, which are attached to the plate by the straps E. The recesses G thus formed in the plate are slightly larger than, and of the shape of, the nut to be fastened, or of such shape as to catch on the sides of the nut after it is screwed up.

In the drawings shown the recess is made to lock a square nut at each one-eighth turn of the same. If a hexagonal or octagonal nut is used the recess may be made of form to suit that shape.

In the washers D are formed the bolt-holes $i$, through which the bolts pass. The said washers are made convex, and may either be of the form stamped from the plate, or may be rounded, as desired.

The plate C has a spring therein, so that when the nuts are screwed down, forcing the washers against the fish-bar, the two ends $c$ of the plate will spring up, the nuts fitting in the recesses G. The plate C is also formed with a bend or rib, L, across the center or near thereto, which gives greater spring or elasticity to the plate, and also serves to allow of the longitudinal expansion or contraction of the rail or fish-bar, or give metal to spread the plate if it is too short for the bolts.

The nuts M are preferably made tapering slightly, the smaller part being toward the washer D and plate C, so that when the plate shall spring up around the nuts the edges of the recesses catch on the nuts and hold more firmly.

The manner of applying my improved nut-lock is as follows: The bolts are passed through the rail and fish-bars, or other joint to be secured, and through the bolt-holes $i$ in the plate C. The nuts are then screwed on in the usual manner, the spring-plate being held against the fish-bar or other surface by the hand or any suitable instrument for the purpose. When the nuts are screwed tight against the washers D and fish-bar, the spring-plate C is freed and springs up around the nuts, the edges of the recesses G catching the nuts and securely locking them. The recesses G, (shown in the drawings,) being of the shape of an eight-pointed star, will catch the square nut M at every one-eighth turn. As the washers are convex in form they will allow of a slight lateral spread of the rail and fish-bar, and prevent the cutting or tearing of the screw-thread on the nut or bolt.

If the plate C does not fit the bolts, all that is necessary is to lengthen or shorten it by a blow on the bend or rib L. The rib L will also permit of the expansion or contraction of the rail without straining the washers or drawing the parts out of proper relative position.

As the nuts M are tapered in form there is not the liability of their catching in the recesses G when being screwed on, and the plate C can gain a firmer hold on them than on the ordinary nut.

When the tapered nut is used the wing-washers on the spring-plate may be dispensed with, and the recesses in the plate made larger than the base, but smaller than the top of the nuts, the plate springing up around the nuts, as above described. I prefer, however, the plate with the wing-washers.

The improved spring-locking plate above described can be easily and rapidly bent and stamped by means of suitably-shaped dies and presses, and the tapered nuts may be formed in the usual manner.

What I claim as my invention, and desire to secure by Letters Patent, is—

1. In devices for locking nuts, the spring-plate C, provided with the bend or rib L, and with two or more wing-washers stamped or cut from the body of the plate, and connected thereto by means of straps, substantially as and for the purposes set forth.

2. In devices for locking nuts, the tapered nuts M, in combination with the spring-plate C, provided with two or more angular recesses, G, in which the tapered nuts fit, substantially as and for the purposes set forth.

3. In devices for locking nuts, the combination of the spring-plate C, provided with the convex wing-washers D, the bolt, and the nut M, whether tapered or not, substantially as and for the purposes set forth.

In testimony whereof I, the said JOHN SMITH, have hereunto set my hand.

JOHN SMITH.

Witnesses:
   WM. J. SMITH,
   JAMES I. KAY.